(12) United States Patent
Yoshida

(10) Patent No.: US 11,535,063 B2
(45) Date of Patent: Dec. 27, 2022

(54) PNEUMATIC TIRE

(71) Applicant: The Yokohama Rubber Co., LTD., Tokyo (JP)

(72) Inventor: Hiroyuki Yoshida, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 290 days.

(21) Appl. No.: 16/634,119

(22) PCT Filed: Jul. 25, 2018

(86) PCT No.: PCT/JP2018/027874
§ 371 (c)(1),
(2) Date: Jan. 24, 2020

(87) PCT Pub. No.: WO2019/022128
PCT Pub. Date: Jan. 31, 2019

(65) Prior Publication Data
US 2020/0317003 A1    Oct. 8, 2020

(30) Foreign Application Priority Data

Jul. 25, 2017  (JP) .............. JP2017-1432442

(51) Int. Cl.
*B60C 11/13* (2006.01)
*B60C 11/03* (2006.01)
*B60C 11/11* (2006.01)

(52) U.S. Cl.
CPC .......... *B60C 11/0309* (2013.01); *B60C 11/13* (2013.01); *B60C 11/1353* (2013.01);
(Continued)

(58) Field of Classification Search
CPC ............. B60C 11/0311; B60C 11/1353; B60C 11/1369; B60C 2011/0313; B60C 2011/1338; B60C 2011/1361
See application file for complete search history.

(56) References Cited

U.S. PATENT DOCUMENTS

| | | |
|---|---|---|
| 6,263,933 B1 | 7/2001 | Baus |
| 2003/0056867 A1 | 3/2003 | Bettiol et al. |
| 2006/0016536 A1* | 1/2006 | Maxwell ............... B60C 11/13 152/209.18 |

FOREIGN PATENT DOCUMENTS

| | | |
|---|---|---|
| CN | 202727890 | 2/2013 |
| JP | S55-072405 | 5/1980 |

(Continued)

OTHER PUBLICATIONS

English machine translation of JPS57-138403. (Year: 1982).*
(Continued)

*Primary Examiner* — Robert C Dye
(74) *Attorney, Agent, or Firm* — Thorpe North & Western

(57) ABSTRACT

Provided is a pneumatic tire. At least three blocks of a plurality of blocks formed on a tread portion, which include an outermost block positioned on an outermost side in a tire lateral direction and are adjacent to each other in the tire lateral direction, and at least two longitudinal grooves positioned between the at least three blocks are arranged on a platform, which is raised from a groove bottom of a lateral groove, has a flat top surface, and has a shape protruding toward both sides in a tire circumferential direction with respect to the at least three blocks. On a groove bottom of a longitudinal groove adjacent to the outermost block, a raised bottom portion raised from the groove bottom of the longitudinal groove is provided. The raised bottom portion connects the outermost block and the block adjacent to the outermost block.

16 Claims, 4 Drawing Sheets

(52) U.S. Cl.
CPC ........... *B60C 11/1369* (2013.01); *B60C 11/11* (2013.01); *B60C 2011/0341* (2013.01); *B60C 2011/0372* (2013.01); *B60C 2011/1338* (2013.01); *B60C 2011/1361* (2013.01)

(56) References Cited

FOREIGN PATENT DOCUMENTS

| | | | |
|---|---|---|---|
| JP | S57-138403 | * | 8/1982 |
| JP | S62-004610 | * | 1/1987 |
| JP | 2001-055017 | | 2/2001 |
| JP | 2006-027610 | | 2/2006 |
| JP | 2009-166554 | * | 7/2009 |
| JP | 2009-220779 | | 10/2009 |
| JP | 2015-128963 | | 7/2015 |
| WO | WO 98/33669 | | 8/1998 |
| WO | WO 01/39994 | | 6/2001 |

OTHER PUBLICATIONS

English machine translation of JPS62-004610. (Year: 1987).*
English machine translation of JP2009-166554. (Year: 2009).*
International Search Report for International Application No. PCT/JP2018/027874 dated Oct. 30, 2018, 4 pages, Japan.

* cited by examiner

PNEUMATIC TIRE

TECHNICAL FIELD

The present technology relates to a pneumatic tire suitable as a tire used for driving on unpaved roads, and more specifically to a pneumatic tire that provides enhanced driving performance on unpaved roads and enhanced wear resistance performance.

BACKGROUND ART

For pneumatic tires used for driving on unpaved roads such as uneven ground, muddy ground, snowy roads, sandy ground, and rocky areas, a tread pattern is generally employed that is based on lug grooves or blocks including many edge components and that has a large groove area. For such a tire, driving performance on unpaved roads is improved by biting into mud, snow, sand, stone, rock, or the like (hereinafter, referred to collectively as "mud or the like") on a road surface to achieve traction performance and preventing grooves from being blocked with mud or the like (for example, see Japan Unexamined Patent Publication No. 2009-220779).

However, in such a tire, the groove area is set to a large value in order to sufficiently bite into mud or the like, or a sipe is formed in each block in order to increase the number of edge components. Thus, there is a problem in that block rigidity is likely to decrease, leading to difficulty in providing both enhanced driving performance on unpaved roads (in particular, traction performance and starting performance) and securing wear resistance performance of the blocks in a compatible manner to a high degree. Thus, there is a demand for measures for effectively biting into mud or the like via grooves to improve driving performance on unpaved roads (in particular, muddy roads), while securing wear resistance performance of the blocks, and providing such performances in a well-balanced, compatible manner.

SUMMARY

The present technology provides a pneumatic tire suitable as a tire used for driving on unpaved roads, which provides enhanced driving performance on unpaved roads and enhanced wear resistance performance.

A pneumatic tire according to the present technology includes a tread portion extending in a tire circumferential direction and having an annular shape, a pair of sidewall portions arranged on both sides of the tread portion, and a pair of bead portions arranged inward of the pair of sidewall portions in a tire radial direction, wherein the tread portion includes a plurality of longitudinal grooves extending in the tire circumferential direction, a plurality of lateral grooves extending in a tire lateral direction, and a plurality of blocks defined by the plurality of longitudinal grooves and the plurality of lateral grooves, at least three blocks of the plurality of blocks, which include an outermost block positioned on an outermost side in the tire lateral direction and are adjacent to each other in the tire lateral direction, and at least two longitudinal grooves positioned between the at least three blocks are present on a platform, which is raised from a groove bottom of each of the plurality of lateral grooves, has a flat top surface, and has a shape protruding toward both sides in the tire circumferential direction with respect to the at least three blocks, on a groove bottom of a longitudinal groove adjacent to the outermost block, a raised bottom portion raised from the groove bottom of the longitudinal groove is provided, and the raised bottom portion connects the outermost block and the block adjacent to the outermost block.

In the present technology, as described above, the platform is provided, and three or more blocks and the longitudinal grooves positioned therebetween are arranged on the platform. Thus, block rigidity can be enhanced, and wear resistance can be enhanced. Further, the outermost block in which uneven wear is likely to be caused is connected with the adjacent block by the raised bottom portion, and has further enhanced rigidity. Thus, uneven wear resistance can also be enhanced. Meanwhile, the platform and the raised bottom portion are provided, and thus recesses and protrusions in the grooves are increased. With this, an edge effect can be obtained with those recesses and protrusions. Further, the grooves are less likely to be clogged with mud and the like due to the increased recesses and protrusions, and hence discharge performance for mud and the like can be enhanced. With this, driving performance on unpaved roads (for example, mud performance) can be enhanced.

In the present technology, the platform preferably has a height from the groove bottom of the lateral groove, the height falling within a range from 5% to 25% of a maximum groove depth of the lateral groove. By setting the height of the platform to fall within an appropriate range as described above, the groove area of the lateral grooves is sufficiently secured, and satisfactory mud performance is obtained. At the same time, the platform secures block rigidity to enhance wear resistance. As a result, such performances can be achieved in a well-balanced, compatible manner.

In the present technology, a ratio of a total area of a road contact surface of the blocks present on the platform with respect to a projected area of the platform preferably falls within a range from 55% to 75%. With this, the platform and the blocks are well balanced, which is advantageous in achieving mud performance and wear resistance performance in a well-balanced, compatible manner.

In the present technology, at least a part of the platform preferably has a step-like structure including one or more steps between the groove bottom of the lateral groove and the top surface of the platform. With this, block rigidity can be secured efficiently with the platform while securing the groove area of the lateral grooves, which is advantageous in achieving mud performance and wear resistance performance in a well-balanced, compatible manner. Further, edge components are increased in the step-like portions, and hence mud performance can further be enhanced.

In the present technology, a cut portion having a V-shape in which an end enters the longitudinal groove is preferably formed in at least one part of the platform. With this, while securing rigidity of the plurality of blocks as a whole on the platform, the cut portion can enhance road surface followability of the individual blocks, which is advantageous in achieving mud performance and wear resistance performance in a well-balanced, compatible manner.

In this case, an angle α of the end of the cut portion preferably falls within a range from 5° to 120°. By setting the angle α as described above, the above-mentioned effect of enhancing road surface followability can be exerted satisfactorily.

In the present technology, the tire circumferential direction length of the raised bottom portion preferably falls within a range from 35% to 75% of the circumferential length of the longitudinal groove in which the raised bottom portion is provided. With this, the groove capacity of the longitudinal groove in which the raised bottom portion is provided is secured sufficiently, and at the same time, an effect of enhancing uneven wear resistance, which is exerted by the raised bottom portion, can be exerted more satisfactorily, which is advantageous in achieving such performances in a well-balanced, compatible manner.

In the present technology, when the raised bottom portion is viewed from the block road contact surface side, both end portions of the raised bottom portion in the tire circumferential direction are preferably bent to recess in a V-shape, and a bend angle β thereof preferably falls within a range from 60° to 170°. With this, the end portion shape of the raised bottom portion is satisfactory, which is advantageous in achieving mud performance and wear resistance performance (particularly, uneven wear resistance performance) in a well-balanced, compatible manner.

In the present technology, the raised bottom portion preferably has a height from the groove bottom of the longitudinal groove, the height falling within a range from 35% to 75% of a maximum groove depth of the longitudinal groove in which the raised bottom portion is formed. By setting the height of the raised bottom portion to fall within an appropriate range, the groove area of the longitudinal groove in which the raised bottom portion is provided can be secured sufficiently to achieve satisfactory mud performance, and an effect of enhancing uneven wear resistance due to the raised bottom portion can be obtained satisfactorily, which is advantageous in achieving such performances in a well-balanced, compatible manner.

"Length" in the present technology is the length in the tread contact surface unless otherwise noted. "Road contact surface" of each block is a surface portion of each block actually contacting a plane on which the tire is placed under a state in which the tire is assembled on a regular rim and inflated to a regular internal pressure, and does not include, for example, a chamfered portion that does not actually contact the plane. Additionally, "ground contact edge" refers to both ends in the tire axial direction in this state. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (The Tire and Rim Association, Inc.), and refers to a "measuring rim" in the case of ETRTO (European Tire and Rim Technical Organization). "Regular internal pressure" is an air pressure defined by standards for each tire according to a system of standards that includes standards on which tires are based, and refers to a maximum air pressure in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. "Regular internal pressure" is 180 kPa for a tire on a passenger vehicle. "Regular load" is a load defined by standards for each tire according to a system of standards that includes standards on which tires are based, and refers to a maximum load capacity in the case of JATMA, refers to the maximum value in the table of "TIRE ROAD LIMITS AT VARIOUS COLD INFLATION PRESSURES" in the case of TRA, and refers to the "LOAD CAPACITY" in the case of ETRTO. "Regular load" is a load equivalent to 88% of the load described above for a tire on a passenger vehicle.

DETAILED DESCRIPTION

Configurations of embodiments of the present technology will be described in detail below with reference to the accompanying drawings.

Figure 1:
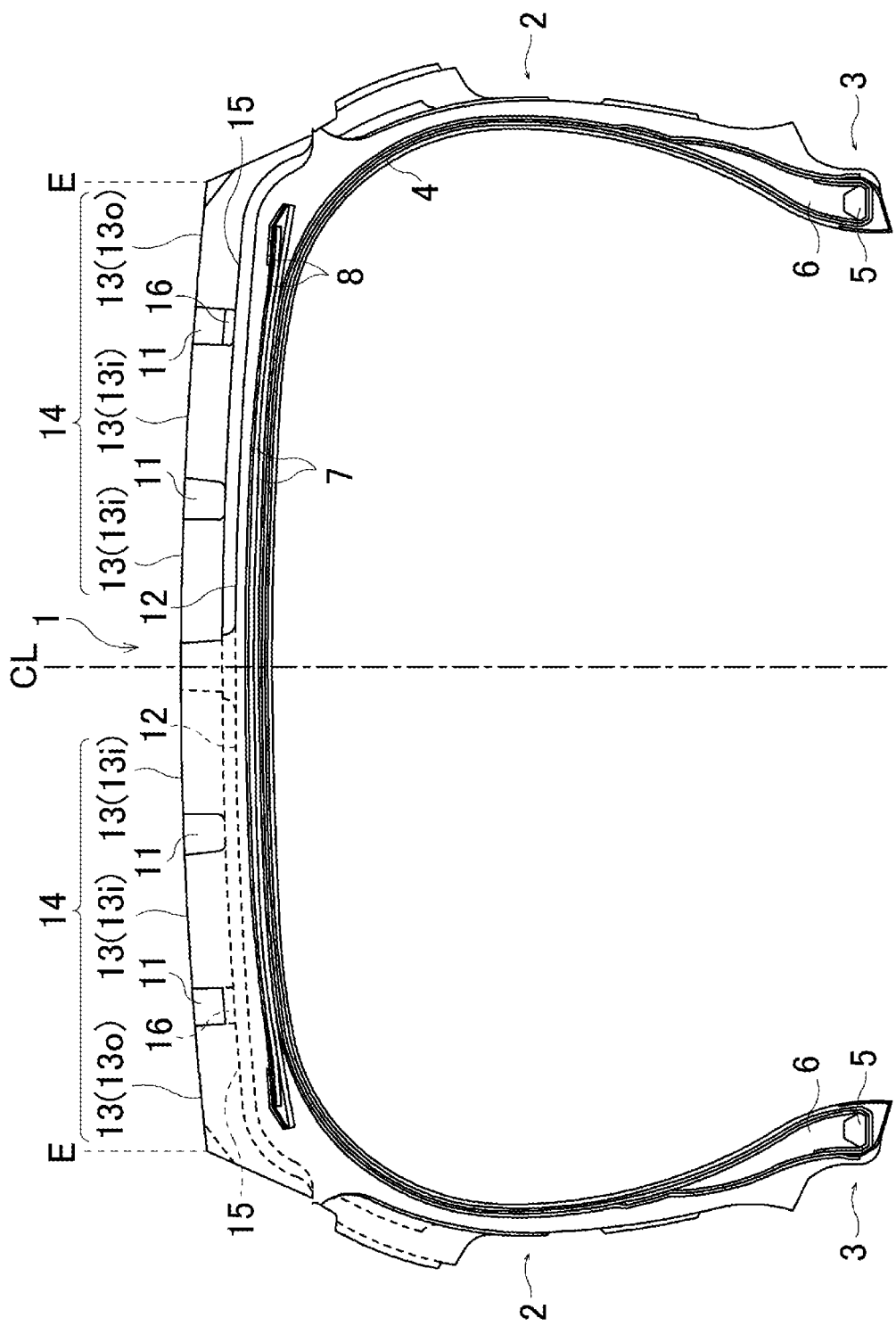
FIG. 1 is a meridian cross-sectional view of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 arranged on both sides of the tread portion 1, and a pair of bead portions 3 disposed inward of the sidewall portions 2 in the tire radial direction. Note that, in FIG. 1, reference sign "CL" denotes a tire equator, and reference sign "E" denotes a ground contact edge.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology may be applied to such a general pneumatic tire, however, the cross-sectional structure thereof is not limited to the basic structure described above.

Figure 2:
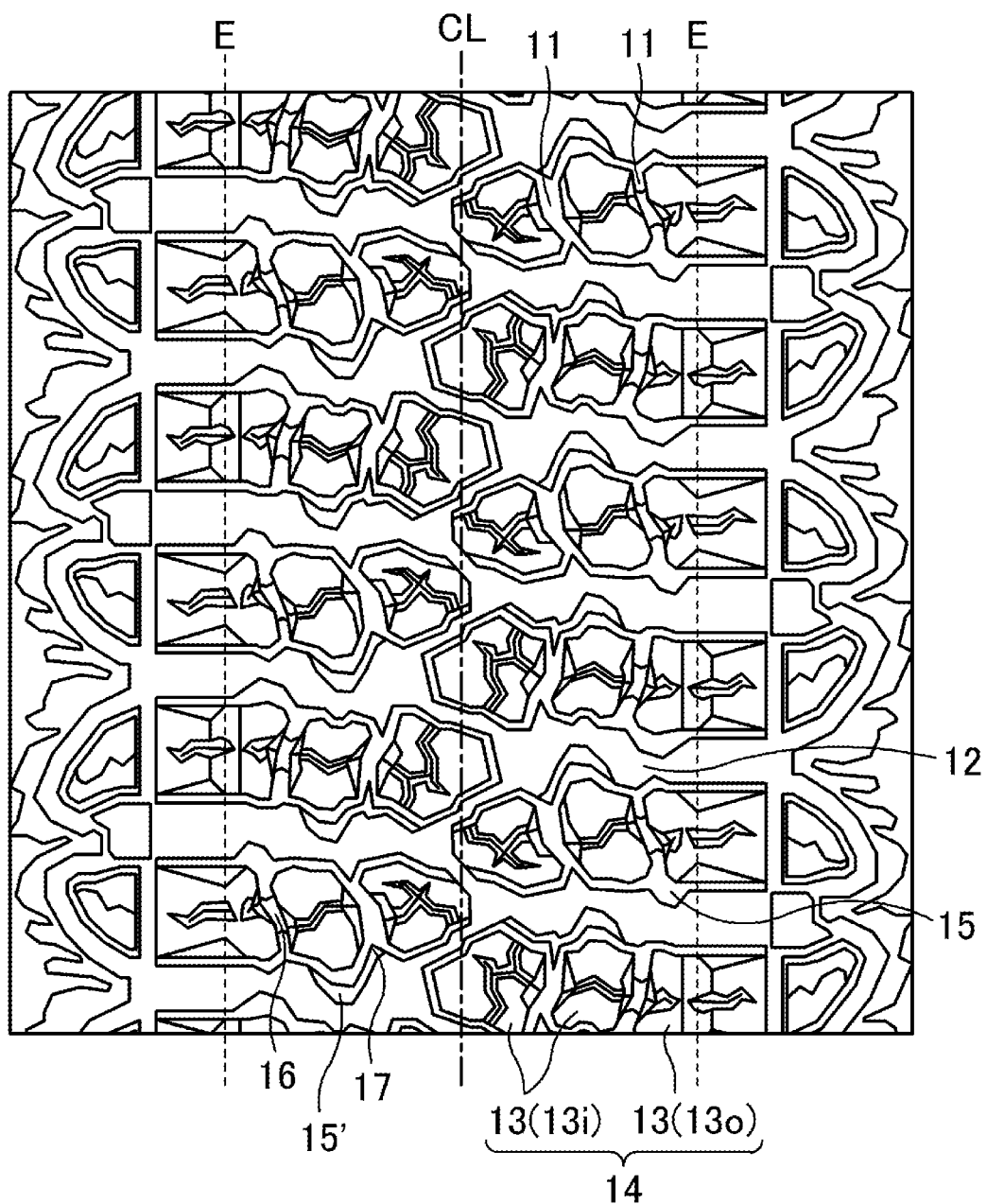
FIG. 2 is a front view illustrating a tread surface of a pneumatic tire according to an embodiment of the present technology.
Figure 3:
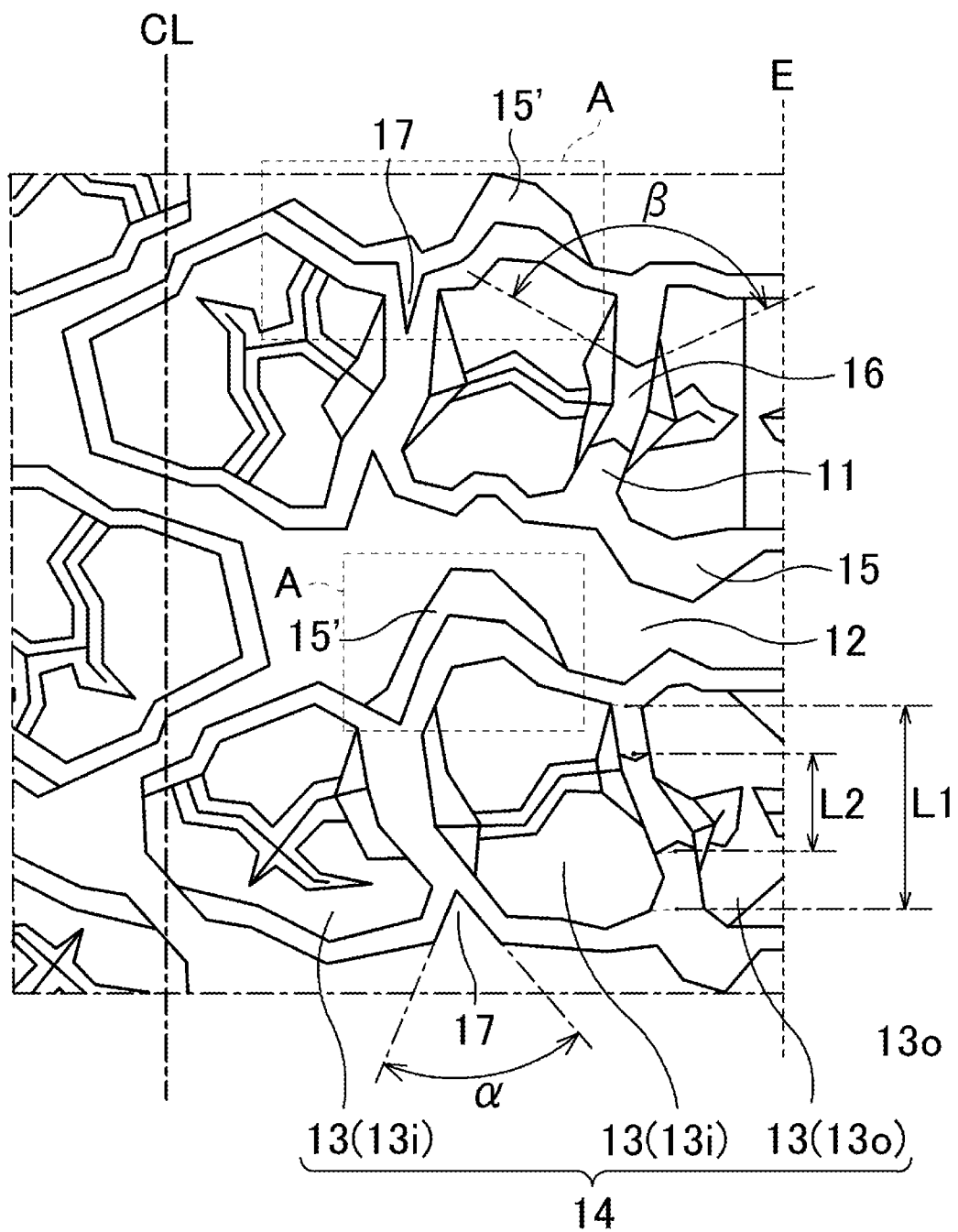
FIG. 3 is a front view illustrating a block on a platform in FIG. 2 in an enlarged manner.

As illustrated in FIG. 2 and FIG. 3, on an outer surface of the tread portion 1 of the pneumatic tire according to an embodiment of the present technology, a plurality of longitudinal grooves 11 extending in the tire circumferential direction, a plurality of lateral grooves 12 extending in a tire lateral direction, and a plurality of blocks 13 defined by the longitudinal grooves 11 and the lateral grooves 12 are formed. Particularly, in the present technology, among the plurality of blocks 13, on a laterally inner side of a block 13 (hereinafter, referred to as an outermost block 13o) which is positioned on an outermost side in the tire lateral direction, a plurality of blocks 13 (hereinafter, referred to as inner blocks 13i) are arranged to be arrayed along the tire lateral direction with respect to the outermost block 13o. Further, block groups 14 each formed of the outermost block 13o and the plurality of inner blocks 13i (specifically, at least three blocks 13 including the outermost block 13o, which are adjacent to each other in the tire lateral direction) thus arranged are repeatedly arranged in the tire circumferential direction across the lateral grooves 12. In the illustrated example, the three blocks 13 including the outermost block 13o and the two inner blocks 13i form the block group 14.

Each of the block groups 14 is present on a platform 15 described later, which is raised from a groove bottom of the lateral groove 12 and has a flat top surface. In this case, the longitudinal grooves 11 positioned between the blocks 13 forming each of the block groups 14 are also present on the platform 15. In other words, at least three blocks 13 including the outermost blocks 13o, which are adjacent to each other in the tire lateral direction, and at least two longitudinal grooves 11 positioned between the blocks 13 are present on the platform 15. Note that the expression that the longitudinal grooves 11 are present on the platform 15 indicates that groove bottoms of the longitudinal grooves 11 are flush with the top surface of the platform 15 or positioned on a block road contact surface side with respect to the top surface of the platform 15.

Figure 4:
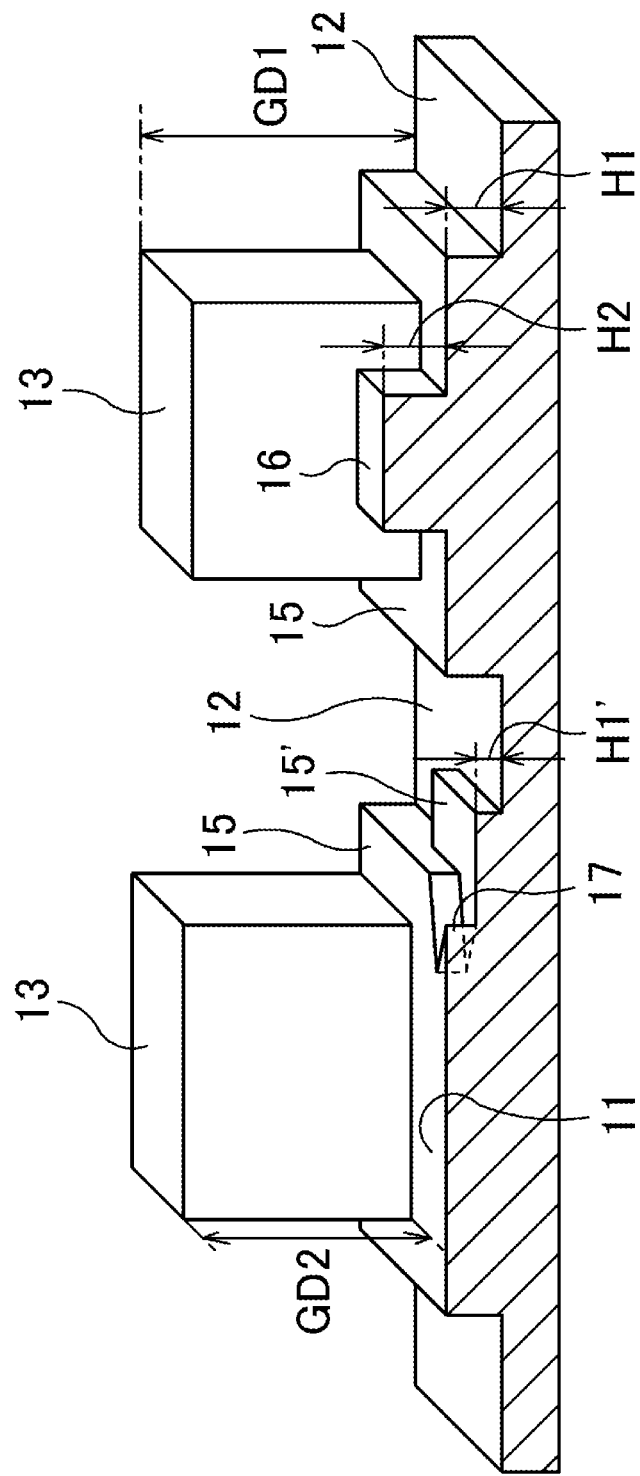
FIG. 4 is an explanatory diagram schematically illustrating a height relationship of portions in the present technology.

As described above, the platform 15 is raised from the groove bottom of the lateral groove 12 and has a flat top surface, and, as illustrated in FIG. 4, is a table-like element enabling the blocks 13 and the longitudinal grooves 11 to be arranged on the top surface. Note that the platform 15 functions as a table on which the blocks 13 and the longitudinal grooves 11 are placed. Thus, a raised height H1 from the groove bottom is limited to fall within a range of, for example, 30% or less of a maximum groove depth GD1 of the lateral grooves 12. Each of the platforms 15 has a shape protruding toward both sides in the tire circumferential direction with respect to the at least three blocks 13 forming each of the platforms 15, as viewed from the block road contact surface side. Particularly, in the illustrated example, a contour line of each of the platforms 15 is bent along contour lines of the at least three blocks 13 forming each of the platform 15.

In addition, in the present technology, on the groove bottom of the longitudinal groove 11 adjacent to the outermost block 13o, a raised bottom portion 16 raised from the groove bottom of the longitudinal groove 11 is provided. Further, the raised bottom portion 16 connects the outermost block 13o and the inner block 13i adjacent to the outermost block 13o.

As described above, the platform 15 raised from the bottom groove of the lateral groove 12 is provided, and three or more blocks 13 and the longitudinal grooves 11 positioned between the blocks 13 are arranged on the platform 15. Thus, rigidity of a series of the block groups 14 can be enhanced, and wear resistance can be enhanced. Further, the outermost block 13o in which uneven wear (heel and toe wear) is likely to be caused is connected with the adjacent inner block 13i by the raised bottom portion 16, and has further enhanced rigidity. Thus, uneven wear resistance can also be enhanced. Meanwhile, the platform 15 and the raised bottom portion 16 are provided, and thus recesses and protrusions in the grooves are increased. With this, an edge effect can be obtained with those recesses and protrusions. Further, the grooves are less likely to be clogged with mud and the like due to the increased recesses and protrusions, and hence discharge performance for mud and the like can be enhanced. With this, driving performance on unpaved roads (for example, mud performance) can be enhanced.

In this case, when the number of blocks 13 present on the platform 15 is two or less, an effect of enhancing block rigidity is limited, and wear resistance cannot be enhanced sufficiently. When the block group 14 present on the platform 15 does not include the outermost block 13o, rigidity of the outermost block 13o cannot be enhanced, and uneven wear resistance cannot be enhanced sufficiently. When the platform 15 does not protrude toward both the sides in the tire circumferential direction with respect to the at least three blocks 13 forming each of the platforms 15, an effect of enhancing rigidity is limited. For example, strength against deformation in the tire circumferential direction cannot be obtained, and wear resistance cannot be enhanced sufficiently. When the raised bottom portion 16 is not provided in the longitudinal groove 11 adjacent to the outermost block 13o, the above-mentioned effect of enhancing uneven wear resistance cannot be obtained. Further, when the raised bottom portion 16 is provided in an area other than the longitudinal groove 11 adjacent to the outermost block 13o, a capacity of the longitudinal grooves 11 cannot be secured sufficiently. Thus, there is a risk of affecting driving performance on unpaved roads (for example, mud performance).

As described above, the raised height H1 of the platform 15 does not exceed preferably 30% of the maximum groove depth GD1 of the lateral grooves 12, and more preferably, falls within a range from 5% to 25% of the maximum groove depth GD1 of the lateral grooves 12. By setting the height H1 of the platform 15 to fall within an appropriate range as described above, the groove area of the lateral grooves 12 is sufficiently secured, and satisfactory mud performance is obtained. At the same time, the platform 15 secures block rigidity to enhance wear resistance. As a result, such performances can be achieved in a well-balanced, compatible manner. In this case, when the raised height H1 of the platform 15 is less than 5% of the maximum groove depth GD1 of the lateral grooves 12, an effect of enhancing block rigidity is limited, and it is difficult to secure wear resistance sufficiently. When the raised height H1 of the platform 15 is greater than 25% of the maximum groove depth GD1 of the lateral grooves 12, the groove area of the lateral grooves 12 is reduced, which may cause a risk of affecting mud performance.

As described above, the platform 15 has a shape protruding toward both the sides in the tire circumferential direction with respect to the at least three blocks 13 forming each of the platforms 15, and hence has an area wider than a road contact surface of the at least three blocks 13 forming each of the platforms 15. Particularly, a ratio of a total area of the road contact surface of the blocks 13 present on the platform 15 with respect to a projected area of the platform 15 preferably falls within a range from 55% to 75%. With this, the platform 15 and the blocks 13 are well balanced, which is advantageous in achieving mud performance and wear resistance performance in a well-balanced, compatible manner. When the ratio of the area is less than 55%, an effect of enhancing block rigidity is limited, and it is difficult to secure wear resistance sufficiently. When the ratio of the area is greater than 75%, the groove area of the lateral grooves 12 is reduced, which may cause a risk of affecting mud performance. Note that the projected area of the platform 15 is an area inside of the contour line of the platform 15 (the entire area including parts in which the blocks 13 are present) as viewed from the block road contact surface side.

In the present technology, as illustrated in FIG. 4, the platform 15 is provided, and thus a step is formed between the groove bottom of the lateral groove 12 and the block road contact surface. Such step exerts an edge effect, which is advantageous in enhancing driving performance on unpaved roads (for example, mud performance). In view of this, it is preferred to adopt a step-like structure including, on at least a part of the platform 15, a step portion 15' having one or more steps between the groove bottom of the lateral groove 12 and the top surface of the platform 15. In other words, it is preferred to provide a portion in which two or more steps are formed between the groove bottom of the lateral groove 12 and the block road contact surface. For example, in the mode in FIG. 3, the portions A surrounded by the dashed lines have a step-like structure. With this, block rigidity can be secured efficiently with the platform 15 while securing the groove area of the lateral grooves 12, which is advantageous in achieving mud performance and wear resistance performance in a well-balanced, compatible manner. Further, edge components are increased in the step-like portions, and hence mud performance can further be enhanced. Note that the step portion 15' is a part of the platform 15, and is lower than the top surface of the platform 15. Thus, a height H1' of the step portion 15' always satisfies the above-mentioned range of the raised height H1 (within the range of 30% or less of the maximum groove depth GD1 of the lateral grooves 12). Preferably, similarly to the raised height H1 of the platform 15, the range from 5% to 25% of the maximum groove depth GD1 of the lateral grooves 12 is satisfied. Further, as described above, the step portion 15' is a part of the platform 15. Thus, the projected area of the platform 15 described above also includes the step portion 15'.

As described above, each of the platforms 15 has a contour bent along the contour of at least three blocks 13 forming each of the platforms 15. At portions corresponding to openings of the longitudinal grooves 11, V-shaped cut portions 17 each having an end entering the longitudinal groove 11 may be formed. In the illustrated example, of the two longitudinal grooves 11 positioned on the platform 15, the longitudinal groove 11 on the inner side in the tire lateral direction has the cut portions 17. By providing such cut portions 17, rigidity of the plurality of blocks 13 on the platform 15 as a whole can be secured, and at the same time, road surface followability of an individual block 13 can be enhanced by the cut portion 17, which is advantageous in achieving mud performance and wear resistance performance in a well-balanced, compatible manner. Note that the positions at which the cut portions 17 are provided are not particularly limited. However, with regard to the outermost blocks 13o in which uneven wear is likely to be caused, enhancement of block rigidity is given preference over enhancement of road surface followability in order to enhance uneven wear resistance. Thus, the cut portions 17 are preferably provided in the longitudinal groove 11 other than the longitudinal groove 11 adjacent to the outermost block 13o.

When the cut portion 17 described above is provided, an angle α of the end of the cut portion 17 is preferably set to fall within a range from 5° to 120°, more preferably, a range from 10° to 120°, in order to satisfactorily exert an effect of enhancing road surface followability described above. When the angle α is less than 5°, the cut portion 17 is likely to be clogged with mud and the like. Thus, there is a risk of affecting driving performance on unpaved roads (for example, mud performance). When the angle α is more than 120°, the end of the cut portion 17 does not sufficiently enter the longitudinal groove 11. Thus, it is difficult to obtain an effect of sufficiently enhancing road surface followability of the individual block 13.

When the raised bottom portion 16 is provided throughout the entire longitudinal groove 11, a groove capacity of the longitudinal groove 11 cannot be secured sufficiently. Thus, a tire circumferential direction length of the raised bottom portion 16 is preferably set to fall within a range from 35% to 75% of a circumferential length of the longitudinal groove 11 in which the raised bottom portion 16 is provided. With this, the groove capacity of the longitudinal groove 11 in which the raised bottom portion 16 is provided is secured sufficiently, and at the same time, an effect of enhancing uneven wear resistance, which is exerted by the raised bottom portion 16, can be exerted more satisfactorily, which is advantageous in achieving such performances in a well-balanced, compatible manner. When the tire circumferential direction length of the raised bottom portion 16 is less than 35% of the circumferential length of the longitudinal groove 11, the raised bottom portion 16 is excessively small. Thus, an effect of enhancing rigidity, which is achieved by connecting the blocks 13 by the raised bottom portion 16, is limited, and hence it is difficult to obtain uneven wear resistance sufficiently. When the tire circumferential direction length of the raised bottom portion 16 is more than 75% of the circumferential length of the longitudinal groove 11, the raised bottom portion 16 is formed in the substantially entire longitudinal groove 11, and the groove capacity of the longitudinal groove 11 cannot be secured sufficiently. Thus, there is a risk of affecting driving performance on unpaved roads (for example, mud performance). Note that the tire circumferential direction length L1 of the longitudinal groove 11 is a length between one opening end to the other end of the longitudinal groove along the tire circumferential direction. Similarly, the tire circumferential direction length L2 of the raised bottom portion 16 is a length between one end portion to the other end portion of the raised bottom portion along the tire circumferential direction. When the opening ends and the end portions are inclined or bent with respect to the tire lateral direction, the length is measured with an intermediate point of a straight line, which connects both the opening ends or both the end portions in the tire lateral direction, as a reference point.

The shape of the raised bottom portion 16 is not particularly limited. For example, when the raised bottom portion 16 is viewed from the block road contact surface side, both the end portions of the raised bottom portion 16 in the tire circumferential direction are preferably bent to recess in a V-shape. In this case, a bend angle β preferably falls within a range from 60° to 170°, more preferably, a range from 90° to 160°. When such shape is adopted, the end portion shape of the raised bottom portion 16 is satisfactorily, which is advantageous in achieving mud performance and wear resistance performance (particularly, uneven wear resistance performance) in a well-balanced, compatible manner. When the bend angle β is less than 60°, the bent portion is likely to be clogged with mud and the like. Thus, there is a risk of affecting driving performance on unpaved roads (for example, mud performance). When the bend angle β is greater than 170°, the circumferential end portions of the raised bottom portion 16 are not sufficiently bent, and become substantially flat. Thus, an effect of obtaining satisfactory balance between mud performance and wear resistance performance (particularly, uneven wear resistance performance) is limited.

In order to prevent the raised bottom portion 16 from largely reducing the groove area of the longitudinal groove 11, a raised bottom height H2 (height H2 from the groove bottom of the longitudinal groove 11) may be set to preferably fall within a range from 35% to 75% of a maximum groove depth GD2 of the longitudinal groove 11 in which the raised bottom portion 16 is formed. By setting the height H2 of the raised bottom portion 16 to fall within an appropriate range as described above, the groove area of the longitudinal groove 11 in which the raised bottom portion 16 is provided can be secured sufficiently to obtain satisfactory mud performance, and at the same time, an effect of enhancing uneven wear resistance, which is exerted by the raised bottom portion 16, can be obtained satisfactorily, which is advantageous in achieving such performance in a well-balanced, compatible manner. When the raised bottom height H2 is less than 35% of the maximum groove depth GD2 of the longitudinal grooves 11, such case is substantially equivalent to a case where the raised bottom portion 16 is not present. Thus, it is difficult to sufficiently obtain an effect of enhancing uneven wear resistance. When the raised bottom height H2 is greater than 75% of the maximum groove depth GD2 of the longitudinal grooves 11, the groove capacity of the longitudinal groove 11 cannot be secured sufficiently. Thus, there is a possibility of affecting driving performance on unpaved roads (for example, mud performance).

In the present technology, of the three or more blocks 13 forming the block group 14 present on the platform 15, the block 13 positioned on the innermost side in the tire lateral direction (on a side opposite to the outermost block 13o) is preferably positioned on the tire equator, as in the illustrated example. Further, with the basis of such block groups 14, the entire tread pattern is preferably point symmetrical with respect to points on the tire equator. With this, the tread pattern with the basis of the block groups 14 present on the platform 15 can be optimized as described above, and driving performance on unpaved roads (for example, mud performance), wear resistance, and uneven wear resistance can be exerted in a well-balanced to a high degree.

EXAMPLES

Twenty-seven types of pneumatic tires in Conventional Example 1, Comparative Example 1, and Examples 1 to 25 were produced. Each of the pneumatic tires had a tire size of 35×12.50 R17, had a basic structure exemplified in FIG. 1, and had a tread pattern as the basis in FIG. 2. Each of the pneumatic tires was produced so as to include a platform satisfying the following conditions as shown in Tables 1 to 3, that is, the number of blocks present on the platform, a ratio of the raised height H1 of the platform with respect to the maximum groove depth GD1 of the lateral groove (a ratio of the raised bottom height), a ratio of the total area of the block road contact surface with respect to the projected area of the platform (a ratio of the area), whether a shape projecting toward both sides in the tire circumferential direction with respect to the blocks is provided (presence or absence of the circumferential projection), whether a step-like structure including a step between the groove bottom of the lateral groove and the top surface of the platform is provided (presence or absence of the step-like structure), presence or absence of a V-shaped cut portion having an end entering the longitudinal groove, and the angle α of the end of the cut portion. Each of the pneumatic tires was produced so as to include a raised bottom portion satisfying the following conditions as shown in Tables 1 to 3, that is, presence or absence of the raised bottom portion, a ratio of the height H2 from the groove bottom of the longitudinal groove with respect to the maximum groove depth GD2 of the longitudinal groove (a ratio of the raised bottom height), a ratio of the tire circumferential direction length of the raised bottom portion with respect to the tire circumferential direction length of the longitudinal groove (a ratio of the tire circumferential direction length), whether both the end portions of the raised bottom portion in the tire circumferential direction are bent to recess in a V-shape (presence or absence of bending of the end portions), and the bend angle β of the end portions of the raised bottom portion.

Note that Conventional Example 1 is an example in which the number of blocks on the platform was one, and is substantially equivalent to a structure in which a platform is formed for individual blocks. Further, in Comparative Example 1, the platform did not have a shape protruding toward both sides in the tire circumferential direction with respect to the blocks, which is substantially equivalent to a structure in which the platform is not provided and the entire longitudinal groove has a raised bottom.

Wear resistance, uneven wear resistance, and mud performance of the twenty-seven types of pneumatic tires were evaluated by the following evaluation methods, and the results are shown in Tables 1 to 3.

Wear Resistance

The test tires were assembled on wheels with a rim size of 17×10.0 J, inflated to an air pressure of 240 kPa, and mounted on a test vehicle (four wheel drive vehicle). After driving on a paved road for 30000 km, the wear amount after the drive was measured. Evaluation results are expressed as index values with a multiplicative inverse value of a measurement value of Conventional Example 1 assigned the index value of 100. Larger index values indicate less wear amounts and superior wear resistance.

Uneven Wear Resistance

The test tires were assembled on wheels with a rim size of 17×10.0 J, inflated to an air pressure of 240 kPa, and mounted on a test vehicle (four wheel drive vehicle). After driving on a paved road for 30000 km, the wear amount of uneven wear (heel and toe wear) in the outermost blocks after the drive was measured. Evaluation results are expressed as index values with a multiplicative inverse value of a measurement value of Conventional Example 1 assigned the index value of 100. Larger index values indicate less wear amounts and superior uneven wear resistance.

Mud Performance

The test tires were assembled on wheels with a rim size of 17×10.0 J, inflated to an air pressure of 240 kPa, and mounted on a test vehicle (four wheel drive vehicle). A test driver performed sensory evaluation on traction performance and startability on a mud road surface. Evaluation results are expressed as index values with Conventional Example 1 being assigned the index value of 100. Larger index values indicate superior mud performance.

TABLE 1

| | | | Conventional Example 1 | Comparative Example 1 | Example 1 | Example 2 |
|---|---|---|---|---|---|---|
| Platform | Number of blocks | Number | 1 | 2 | 3 | 4 |
| | Ratio of raised height | % | 0 | 23 | 23 | 23 |
| | Ratio of area | % | 68 | 68 | 68 | 68 |
| | Presence or absence of circumferential projection | | Yes | No | Yes | Yes |

TABLE 1-continued

|  |  |  |  |  |  |  |
|---|---|---|---|---|---|---|
|  | Presence or absence of step structure |  | No | No | No | No |
|  | Presence or absence of cut portion |  | No | No | No | No |
|  | Angle α of end of cut portion | ° | — | — | — | — |
| Raised bottom portion | Presence or absence |  | — | No | Yes | Yes |
|  | Ratio of raised bottom height | % | — | — | 52 | 52 |
|  | Ratio of tire circumferential direction length | % | — | — | 45 | 45 |
|  | Presence or absence of bending of end portion |  | — | — | Yes | Yes |
|  | Bend angle β | ° | — | — | 150 | 150 |
|  | Wear resistance | Index value | 100 | 98 | 103 | 102 |
|  | Uneven wear resistance | Index value | 100 | 99 | 105 | 105 |
|  | Mud performance | Index value | 100 | 102 | 112 | 112 |

|  |  |  | Example 3 | Example 4 | Example 5 | Example 6 |
|---|---|---|---|---|---|---|
| Platform | Number of blocks | Number | 3 | 3 | 3 | 3 |
|  | Ratio of raised height | % | 2 | 5 | 25 | 35 |
|  | Ratio of area | % | 68 | 68 | 68 | 68 |
|  | Presence or absence of circumferential projection |  | Yes | Yes | Yes | Yes |
|  | Presence or absence of step structure |  | No | No | No | No |
|  | Presence or absence of cut portion |  | No | No | No | No |
|  | Angle α of end of cut portion | ° | — | — | — | — |
| Raised bottom portion | Presence or absence |  | Yes | Yes | Yes | Yes |
|  | Ratio of raised bottom height | % | 52 | 52 | 52 | 52 |
|  | Ratio of tire circumferential direction length | % | 45 | 45 | 45 | 45 |
|  | Presence or absence of bending of end portion |  | Yes | Yes | Yes | Yes |
|  | Bend angle β | ° | 150 | 150 | 150 | 150 |
|  | Wear resistance | Index value | 101 | 102 | 103 | 103 |
|  | Uneven wear resistance | Index value | 103 | 104 | 105 | 105 |
|  | Mud performance | Index value | 112 | 112 | 111 | 109 |

TABLE 2

|  |  |  | Example 7 | Example 8 | Example 9 | Example 10 | Example 11 |
|---|---|---|---|---|---|---|---|
| Platform | Number of blocks | Number | 3 | 3 | 3 | 3 | 3 |
|  | Ratio of raised height | % | 23 | 23 | 23 | 23 | 23 |
|  | Ratio of area | % | 40 | 55 | 75 | 95 | 68 |
|  | Presence or absence of circumferential projection |  | Yes | Yes | Yes | Yes | Yes |
|  | Presence or absence of step structure |  | No | No | No | No | Yes |
|  | Presence or absence of cut portion |  | No | No | No | No | No |
|  | Angle α of end of cut portion | ° | — | — | — | — | — |
| Raised bottom portion | Presence or absence |  | Yes | Yes | Yes | Yes | Yes |
|  | Ratio of raised bottom height | % | 52 | 52 | 52 | 52 | 52 |
|  | Ratio of tire circumferential direction length | % | 45 | 45 | 45 | 45 | 45 |

TABLE 2-continued

|  |  |  |  |  |  |  |  |
|---|---|---|---|---|---|---|---|
|  | Presence or absence of bending of end portion |  | Yes | Yes | Yes | Yes | Yes |
|  | Bend angle β | ° | 150 | 150 | 150 | 150 | 150 |
|  | Wear resistance | Index value | 101 | 102 | 103 | 103 | 103 |
|  | Uneven wear resistance | Index value | 103 | 104 | 105 | 105 | 105 |
|  | Mud performance | Index value | 114 | 114 | 111 | 109 | 114 |

|  |  |  | Example 12 | Example 13 | Example 14 | Example 15 |
|---|---|---|---|---|---|---|
| Platform | Number of blocks | Number | 3 | 3 | 3 | 3 |
|  | Ratio of raised height | % | 23 | 23 | 23 | 23 |
|  | Ratio of area | % | 68 | 68 | 68 | 68 |
|  | Presence or absence of circumferential projection |  | Yes | Yes | Yes | Yes |
|  | Presence or absence of step structure |  | Yes | Yes | Yes | Yes |
|  | Presence or absence of cut portion |  | Yes | Yes | Yes | Yes |
|  | Angle α of end of cut portion | ° | 5 | 10 | 60 | 120 |
| Raised bottom portion | Presence or absence |  | Yes | Yes | Yes | Yes |
|  | Ratio of raised bottom height | % | 52 | 52 | 52 | 52 |
|  | Ratio of tire circumferential direction length | % | 45 | 45 | 45 | 45 |
|  | Presence or absence of bending of end portion |  | Yes | Yes | Yes | Yes |
|  | Bend angle β | ° | 150 | 150 | 150 | 150 |
|  | Wear resistance | Index value | 103 | 103 | 103 | 103 |
|  | Uneven wear resistance | Index value | 105 | 105 | 105 | 105 |
|  | Mud performance | Index value | 115 | 116 | 117 | 116 |

TABLE 3

|  |  |  | Example 16 | Example 17 | Example 18 | Example 19 | Example 20 |
|---|---|---|---|---|---|---|---|
| Platform | Number of blocks | Number | 3 | 3 | 3 | 3 | 3 |
|  | Ratio of raised height | % | 23 | 23 | 23 | 23 | 23 |
|  | Ratio of area | % | 68 | 68 | 68 | 68 | 68 |
|  | Presence or absence of circumferential projection |  | Yes | Yes | Yes | Yes | Yes |
|  | Presence or absence of step structure |  | Yes | Yes | Yes | Yes | Yes |
|  | Presence or absence of cut portion |  | Yes | Yes | Yes | Yes | Yes |
|  | Angle α of end of cut portion | ° | 60 | 60 | 60 | 60 | 60 |
| Raised bottom portion | Presence or absence |  | Yes | Yes | Yes | Yes | Yes |
|  | Ratio of raised bottom height | % | 35 | 75 | 52 | 52 | 52 |
|  | Ratio of tire circumferential direction length | % | 45 | 45 | 25 | 35 | 75 |
|  | Presence or absence of bending of end portion |  | Yes | Yes | Yes | Yes | Yes |
|  | Bend angle β | ° | 150 | 150 | 150 | 150 | 150 |
|  | Wear Resistance | Index value | 102 | 103 | 102 | 103 | 103 |
|  | Uneven wear resistance | Index value | 103 | 105 | 104 | 104 | 105 |
|  | Mud performance | Index value | 116 | 112 | 116 | 116 | 115 |

|  |  |  | Example 21 | Example 22 | Example 23 | Example 24 | Example 25 |
|---|---|---|---|---|---|---|---|
| Platform | Number of blocks | Number | 3 | 3 | 3 | 3 | 3 |
|  | Ratio of raised height | % | 23 | 23 | 23 | 23 | 23 |
|  | Ratio of area | % | 68 | 68 | 68 | 68 | 68 |
|  | Presence or absence of circumferential projection |  | Yes | Yes | Yes | Yes | Yes |

TABLE 3-continued

|  |  |  |  |  |  |  |  |
|---|---|---|---|---|---|---|---|
|  | Presence or absence of step structure |  | Yes | Yes | Yes | Yes | Yes |
|  | Presence or absence of cut portion |  | Yes | Yes | Yes | Yes | Yes |
|  | Angle α of end of cut portion | ° | 60 | 60 | 60 | 60 | 60 |
| Raised bottom portion | Presence or absence |  | Yes | Yes | Yes | Yes | Yes |
|  | Ratio of raised bottom height | % | 52 | 52 | 52 | 52 | 52 |
|  | Ratio of tire circumferential direction length | % | 80 | 45 | 45 | 45 | 45 |
|  | Presence or absence of bending of end portion |  | Yes | Yes | Yes | Yes | Yes |
|  | Bend angle β | ° | 150 | 50 | 60 | 170 | 180 |
|  | Wear Resistance | Index value | 103 | 103 | 103 | 103 | 102 |
|  | Uneven wear resistance | Index value | 105 | 105 | 105 | 105 | 105 |
|  | Mud performance | Index value | 114 | 116 | 116 | 118 | 118 |

As is clear from Table 1, as compared to Conventional Example 1, Examples 1 to 25 provided enhanced wear resistance, uneven wear resistance, and mud performance, and achieve such performances in a well-balanced, compatible manner to a high degree. Note that only the mud performance on muddy road surfaces was evaluated but that, even in a case where the vehicle travels on other unpaved roads (snowy roads, sandy ground, rocky areas, or the like), the tire according to the embodiment of the present technology provides the same functions for snow, sand, stone, rock, or the like on road surfaces as the functions for mud on muddy road surfaces, and thus favorably exhibits superior driving performance on unpaved roads and high damage resistance.

In contrast, Comparative Example 1 had the small number of blocks present on the platform, and failed to enhance block rigidity sufficiently. Thus, an effect of enhancing wear resistance and uneven wear resistance was not obtained sufficiently. Comparative Example 1 did not have a platform having a shape protruding in the circumferential direction with respect to the blocks, and failed to enhance block rigidity sufficiently. Thus, an effect of enhancing wear resistance and uneven wear resistance was not obtained sufficiently. Comparative Example 1 did not have a raised bottom portion, and failed to enhance rigidity of the outermost blocks sufficiently. Thus, an effect of enhancing uneven wear resistance as not obtained.

The invention claimed is:

1. A pneumatic tire, comprising:
a tread portion extending in a tire circumferential direction and having an annular shape;
a pair of sidewall portions arranged on both sides of the tread portion; and
a pair of bead portions arranged inward of the pair of sidewall portions in a tire radial direction, wherein
the tread portion comprises:
a plurality of longitudinal grooves extending in the tire circumferential direction;
a plurality of lateral grooves extending in a tire lateral direction; and
a plurality of blocks defined by the plurality of longitudinal grooves and the plurality of lateral grooves,
at least three blocks of the plurality of blocks, which include an outermost block positioned on an outermost side in the tire lateral direction and are adjacent to each other in the tire lateral direction, and at least two longitudinal grooves positioned between the at least three blocks are present on a platform, which is raised from a groove bottom of each of the plurality of lateral grooves, has a flat top surface, and has a shape protruding toward both sides in the tire circumferential direction with respect to the at least three blocks,
on a groove bottom of a longitudinal groove adjacent to the outermost block, a raised bottom portion raised from the groove bottom of the longitudinal groove is provided,
the raised bottom portion connects the outermost block and the block adjacent to the outermost block, and
only one raised bottom portion is present between the at least three blocks.

2. The pneumatic tire according to claim 1, wherein the platform has a height from the groove bottom of each of the plurality of lateral grooves, the height falling within a range from 5% to 25% of a maximum groove depth of each of the plurality of lateral grooves.

3. The pneumatic tire according to claim 1, wherein a ratio of a total area of a road contact surface of the blocks present on the platform with respect to a projected area of the platform falls within a range from 55% to 75%.

4. The pneumatic tire according to claim 1, wherein at least a part of the platform has a step-like structure including one or more steps between the groove bottom of each of the plurality of lateral grooves and the top surface of the platform.

5. The pneumatic tire according to claim 1, wherein a cut portion having a V-shape in which an end enters the longitudinal groove is formed in at least one part of the platform.

6. The pneumatic tire according to claim 5, wherein an angle α of the end of the cut portion falls within a range from 5° to 120°.

7. The pneumatic tire according to claim 1, wherein the raised bottom portion has a tire circumferential direction length falling within a range from 35% to 75% of a circumferential length of the longitudinal groove in which the raised bottom portion is provided.

8. The pneumatic tire according to claim 1, wherein when the raised bottom portion is viewed from a block contact surface side, both end portions of the raised bottom portion in the tire circumferential direction are bent to recess in a V-shape, and have a bend angle β falling within a range from 60° to 170°.

9. The pneumatic tire according to claim 1, wherein the raised bottom portion has a height from the groove bottom of the longitudinal groove, the height falling within a range from 35% to 75% of a maximum groove depth of the longitudinal groove in which the raised bottom portion is formed.

10. The pneumatic tire according to claim 2, wherein a ratio of a total area of a road contact surface of the blocks present on the platform with respect to a projected area of the platform falls within a range from 55% to 75%.

11. The pneumatic tire according to claim 10, wherein at least a part of the platform has a step-like structure including one or more steps between the groove bottom of each of the plurality of lateral grooves and the top surface of the platform.

12. The pneumatic tire according to claim 11, wherein a cut portion having a V-shape in which an end enters the longitudinal groove is formed in at least one part of the platform.

13. The pneumatic tire according to claim 12, wherein an angle $\alpha$ of the end of the cut portion falls within a range from 5° to 120°.

14. The pneumatic tire according to claim 12, wherein the raised bottom portion has a tire circumferential direction length falling within a range from 35% to 75% of a circumferential length of the longitudinal groove in which the raised bottom portion is provided.

15. The pneumatic tire according to claim 14, wherein when the raised bottom portion is viewed from a block contact surface side, both end portions of the raised bottom portion in the tire circumferential direction are bent to recess in a V-shape, and have a bend angle $\beta$ falling within a range from 60° to 170°.

16. The pneumatic tire according to claim 15, wherein the raised bottom portion has a height from the groove bottom of the longitudinal groove, the height falling within a range from 35% to 75% of a maximum groove depth of the longitudinal groove in which the raised bottom portion is formed.

* * * * *